United States Patent [19]
Bradley

[11] Patent Number: 4,573,764
[45] Date of Patent: Mar. 4, 1986

[54] REAR PROJECTION SCREEN

[75] Inventor: Ralph H. Bradley, Kingsport, Tenn.

[73] Assignee: North American Philips Consumer Electronics Corp., New York, N.Y.

[21] Appl. No.: 567,101

[22] Filed: Dec. 30, 1983

[51] Int. Cl.⁴ .............................................. G03B 21/60
[52] U.S. Cl. .................................. 350/128; 350/126; 350/129
[58] Field of Search ............................... 350/127–129, 350/126

[56] References Cited

U.S. PATENT DOCUMENTS 4,468,092 8/1984 Inoue et al. .......................... 350/128
4,469,402 9/1984 Yata et al. ........................... 350/128

Primary Examiner—Richard A. Wintercorn
Attorney, Agent, or Firm—Thomas A. Briody; William J. Streeter; Edward W. Goodman

[57] ABSTRACT

A rear projection screen is disclosed which uses a front surface lenticular array to distribute light from projection light sources through a horizontal angle of virtually 180° with uniform luminance. Each lenticular element of the array is characterized by having a height to width ratio of at least 3:2 and a pitch width to tip width ratio of at least 2:1. The lenticular array is further characterized as having the capability of having up to two-thirds of the front surface area black masked. When used in a color television system, the rear projection screen exhibits minimal color shift.

25 Claims, 6 Drawing Figures

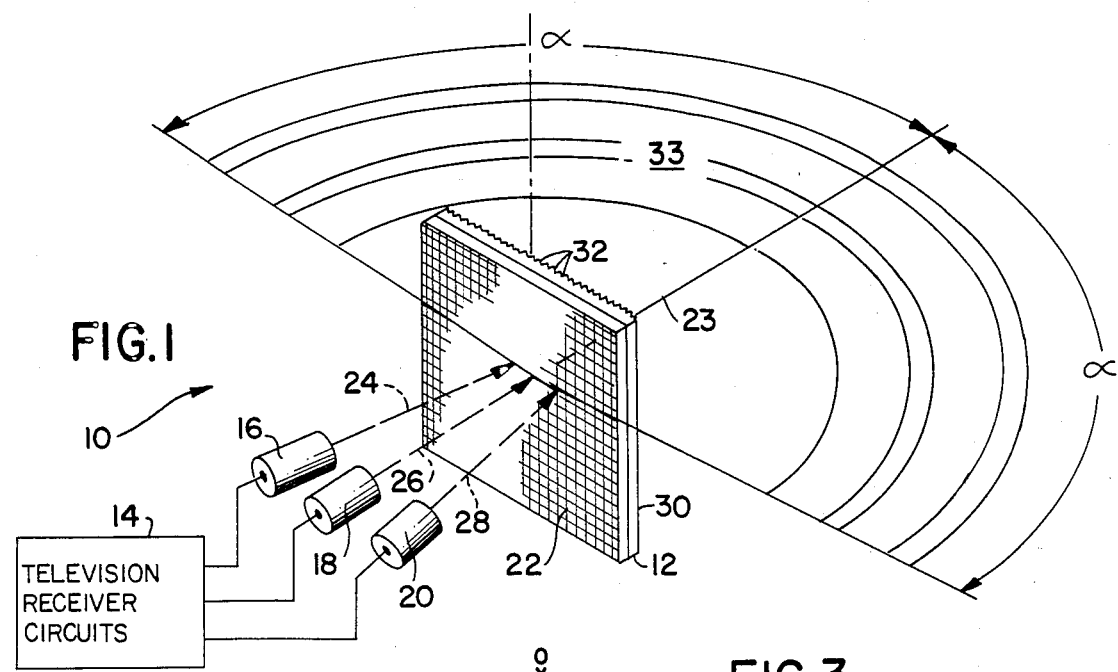
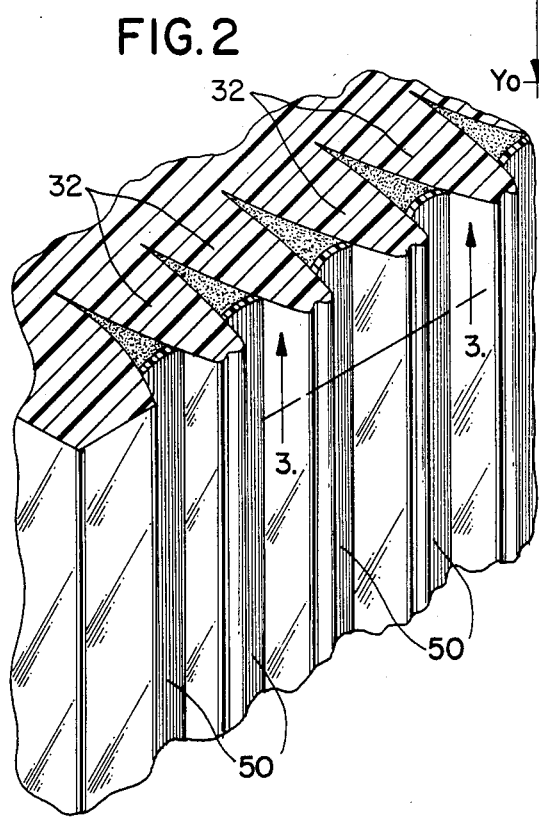
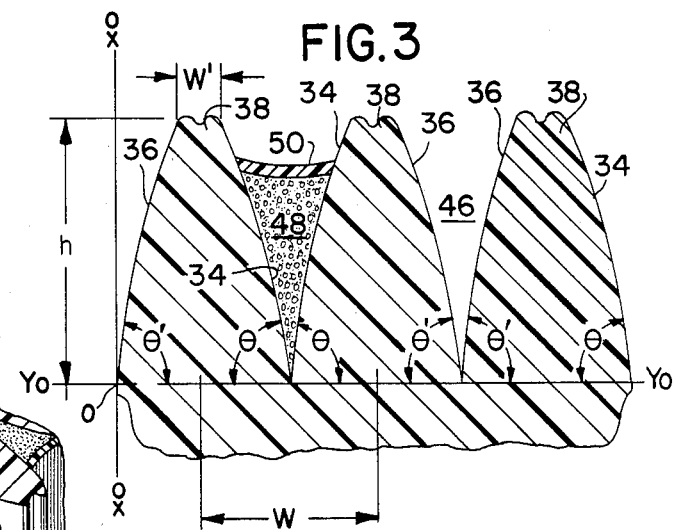
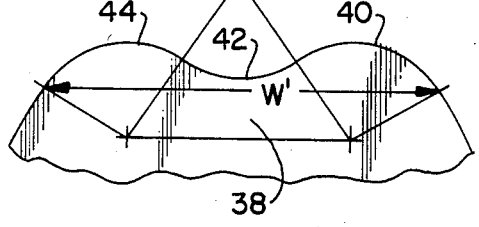
FIG.1
FIG.2
FIG.3
FIG.4

REAR PROJECTION SCREEN

BACKGROUND OF THE INVENTION

The present invention generally relates to a rear projection screen for use in displaying an image projected from an image source. More particularly, the invention is directed to a rear projection screen which utilizes a front surface lenticular array to distribute light from the image source. In this regard, an important aspect of the present invention concerns a novel lenticular lens construction having a side reflective region and a tip refracting region and a novel shape for the tip refracting region which distributes light from the projection light source horizontally through virtually 180° with perceptually uniform luminance.

Rear projection screens are utilized in various types of equipment, such as projection-based radar displays, flight simulators, avionic displays, traffic control lights, microfilm readers, video games, projection-based video monitors, and rear-projection film media displays for generating a user-viewable display. In such applications, an image source located behind the screen projects light forward along a projection axis toward the screen to form an image at the plane of the screen which is distributed to viewers on the front side of the screen.

Where multiple viewers are present, such viewers are typically spread out horizontally, and distribution of light through a large horizontal angle is desirable. This is particularly true in rear screen projection television receivers, where multiple viewers are generally present and seated throughout a relatively wide horizontal angle relative to the screen.

One problem encountered in rear projection systems is that more light energy is projected along the projector axis than elsewhere, so that the closer an observer is to the projection axis, the brighter the image appears to him. Rear screen projection color video units typically utilize three cathode ray tubes, one for each of the primary red, green, and blue colors, which project through individual projection lens assemblies onto the projection screen. In a typical horizontal arrangement of the cathode ray tubes, the green cathode ray tube is typically positioned in the center along the projection axis, and the red and blue cathode ray tubes are positioned with their optical axes offset with respect to the green optical axis at an angle of 5° to 11°. These offsets, unless corrected for by the screen, give rise to a phenomenon known as color shift. That is, if the red, green and blue light luminances for the center of the viewing audience are normalized, the ratio of the luminances will vary with angular position throughout the horizontal viewing plane. Thus, the viewer's perception of the image depends upon the viewer's horizontal placement with respect to the screen.

In addition, when rear projection screens are operated in and exposed to ambient light, the contrast of the projected image is affected by the reflection of such light at the front side of the screen. Thus, it is desirous to reduce reflection of such light at the front side of the screen. Various masking techniques, wherein a black non-reflective surface is interposed between the lenticules, have been proposed for minimizing light reflection. One such technique, which is particularly effective is described in the copending application of Douglas A. Stanton, entitled "Improved Blackened Optical Transmission System", Ser. No. 567,022, filed concurrently herewith.

Various rear projection screens have been proposed to increase the horizontal viewing angle range. One such system, which is described in U.S. Pat. No. 3,578,841 to William R. Elmer, utilizes a screen having a rear surface, such as a Fresnel lens, capable of collimating light from the image source into parallel rays, and a front surface formed with a vertically-ribbed spreading lens to spread light throughout a specified horizontal viewing angle. The shape of the vertical ribs of the spreading lens is defined by an equation dependent upon the desired angle of spread from the center line. However, ribs drawn in accordance with such an equation become seriously inefficient when spreading light through more than a 60° viewing angle, i.e. 30° on either side of the center line, and necessitate positioning such ribs between a pair of sharply pointed side ribs to increase the viewing angle to 90°, i.e. 45° on either side of the center line.

Other types of rear projection screens are described in an article by Yoshito Miyatake and Yoshitomi Nagaoka, entitled "One-Piece Type, Super Wide Angle Rear Projection Screen," published in Japan Display '83–587. One screen, identified as Phase-III, utilizes a trapezoidal lenticule having an upper surface the same in cross-section as that of a conventional cylindrical lenticule, and side surfaces which are flat and slightly tilted to the center axis of the rear screen, and alternating conventional cylindrical lenticules. According to the article, Phase-III screens have a horizontal viewing angle of ±60° but are prone to rapid color-shifts when utilized as rear projection televison screens. The second screen, identified as Phase-IV, utilizes a trapezoidal lenticule, the surface of which is formed into two cylindrical surfaces and alternating standard cylindrical lenticules. The standard cylindrical lenticules are interposed between the two cylindrical surfaces of the trapezoidal lenticules. According to the article, such a configuration decreases the rapid color-shift of Phase-III while allowing relatively large horizontal viewing angles. However, the resulting Phase-IV lenticule is extremely foreshortened in cross-section, having a greater width than height, with the width of the tip portion only slightly less than the overall width of the lenticule, which limits the extent of black masking possible and which also limits the amount by which the light can be spread uniformly in the horizontal direction. The present invention is directed to a display screen construction which avoids these shortcomings.

SUMMARY OF THE INVENTION

The rear projection screen of the present invention utilizes a lenticular array having lenticules characterized by a height to overall width ratio of at least 1:1 and an overall width to tip width ratio of at least 2:1. In addition, the side of the lenticules are primarily internally reflective directing light from the projection source(s) into the tip region which refracts light primarily and does not reflect an appreciable amount of light into the audience field. In the preferred embodiment, the tip region is comprised of two convex cylindrical elements and a central concave cylinder element. Such a lenticular array has been found to exhibit exceptional horizontal dispersion of light. In addition, when utilized in a system having more than a single color source, such as in a color rear projection television system having three separate horizontal disposed cathode ray tubes, the lenticular array of the present invention has demonstrated minimal color shift. Furthermore, the overall height to width ratio of the lenticule as well as the tip width to overall width ratio provides a rear projection screen which can have almost 60° of its area black masked.

Accordingly, it is a general object of the present invention to provide a new and improved rear projection screen.

It is another object of the present invention to provide a rear projection screen which distributes light horizontally through a wide viewing angle with perceptually uniform luminance.

It is another object of the present invention to provide a rear projection screen which when used to project an image from multiple projectors of differing color does so with minimal color shift.

It is another object of the present invention to provide a rear projection screen having exceptionally good contrast and being capable of having a significant portion of the projected surface area black masked.

DESCRIPTION OF THE DRAWINGS

These and other objects of the present invention will be apparent from the following detailed description thereof, taken in conjunction with the accompanying drawings wherein:

FIG. 1 shows a view in perspective of a rear projection screen constructed in accordance with the present invention showing the screen as utilized in a rear projection color television application;

FIG. 2 is an enlarged perspective partial cross-sectional view of the lenticular array utilized in the preferred embodiment of the rear projection screen of the present invention;

FIG. 3 is a cross-sectional view taken through the line 3—3 of FIG. 2;

FIG. 4 is an enlarged view of the tip portion of one of the lenticular lenses shown in FIG. 3;

DESCRIPTION OF THE PREFERRED EMBODIMENT

Figure 5:
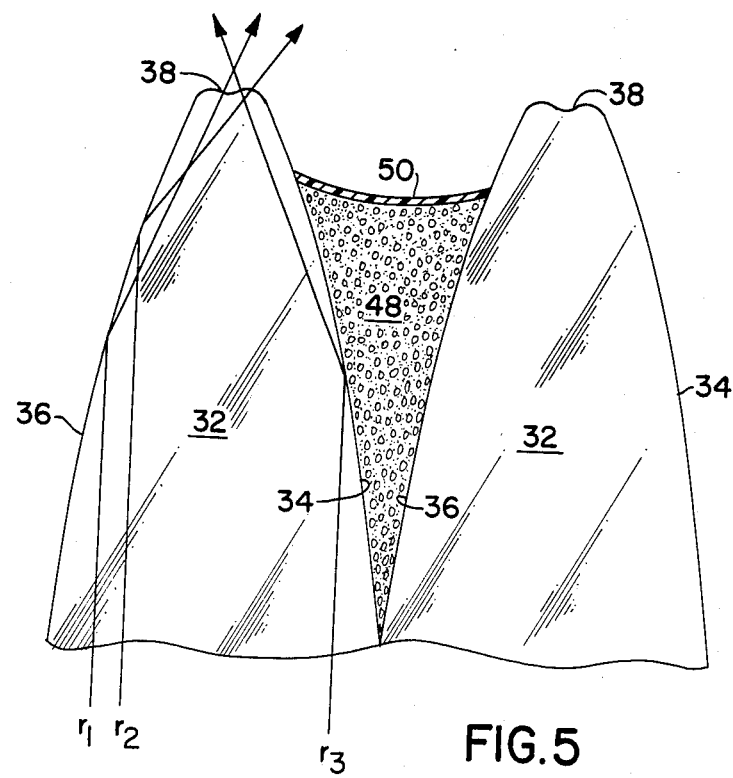
FIG. 5 is a view similar to that of FIG. 3 and shows rays of light being transmitted from the projection source to the viewing area through the lenticular lens of the present invention.

In order to facilitate understanding of the rear projection screen of the present invention, the general arrangement and operation of a projection assembly employing a rear projection screen embodying the present invention will first be described, and the shapes of various lens surfaces which may be employed in the screen, and the methods of deriving these shapes, will subsequently be described.

Accordingly, FIG. 1 illustrates a rear projection color television system 10 employing a rear projection screen 12 constructed in accordance with the present invention. In this arrangement, television video source signals are received by television receiver circuits 14 and are projected through individual red, green and blue projection cathode ray tube assemblies 16, 18, and 20, respectively, onto the rear surface 22 of the projection screen 12. The three cathode ray tubes (CRTs) 16, 18 and 20 are horizontally arranged with respect to the projection axis 23 and with the green CRT 18 in the center. Such a horizontal distribution results in the three CRTs 16, 18 and 20 having their optical axes 24, 26 and 28, respectively, angularly offset with respect to each other. Typically, the red optical axis 24 and the blue optical axis 28 are each angularly offset between 5 and 11 degrees with respect to the green optical axis 26.

The rear surface 22 of the rear projection screen 12 is planar and is normally provided with collimating lenses such as Fresnel lenses for collimating the divergent light rays from the projectors 16, 18 and 20 into parallel rays in accordance with well-known principles of operation of Fresnel lenses. The front surface 30 of the screen 12 is generally planar and includes a plurality of closely spaced vertical lenticular lens elements 32 thereon. In accordance with the present invention the lenticular elements 32 are shaped to refract and spread light horizontally through a wide horizontal viewing angle $\alpha$ in the audience field 33.

In the past, rear projection screen assemblies such as that depicted in FIG. 1 have utilized both two-piece screens and one-piece screens, depending upon the particular screen characteristics required. For instance, two-piece screens, which the Fresnel lenses are separate from the lenticular lens elements 32, have been characterized by providing a reasonably broad horizontal distribution of light, but subject to decreased resolution of projected images and to ghost images. In addition, with the broad horizontal distribution of light of such constructions, precise manufacturing control of registration and thickness of the screen must be attained to minimize color shift. One-piece screens have been characterized as having improved resolution but a limited horizontal viewing angle typically in the range of approximately ±30°. The vertical lens construction of the present invention can be employed in either a one-piece type or two-piece type screen and effectively distribute light horizontally through a viewing angle $\alpha$ of ±85° with perceptually uniform luminance and minimal color shift.

Referring to FIG. 2, the front surface 30 of projection screen 12 is seen to include a plurality of parallel spaced vertically aligned lenticular lens elements 32. As shown in FIG. 3, the center to center distance between lenticular elements 32 is the lenticular pitch w. The lenticular pitch of a projection screen 12 constructed in accordance with the invention can be changed to accommodate a particular application without changing the performance of the screen provided all dimensions of the lenticular elements 32 are changed in the same proportion. In practice, lenticular pitch is selected according to overall screen size and the number of lenticular cycles desired across the screen. For example, when utilized in a rear projection television screen, the pitch of the lenticular elements 32 may typically range from approximately 0.3 mm to 1.0 mm for diagonal screens ranging from approximately 26 inches to 72 inches. By forming the elements 32 sufficiently fine and close, the viewer observes essentially a smooth continuous picture, in much the same manner as the 525 horizontal lines on a television screen appear, from a normal viewing distance, to merge into a continuous picture or image.

When constructing a lenticular array comprising the lenticular elements 32 of the present invention, adjacent elements preferably touch so that the distance between elements is zero and the lenticular pitch equals the width of each element. However, in practice, some transition between elements 32 may be required. This can be accomplished in various ways such as by providing a simple radius. Preferably, the width of such a transition, if utilized, is less than one percent of the element width.

Each lenticular lens element 32 has side surfaces 34 and 36 and an upper tip surface 38. The side surfaces 34 and 36 may be linear, approximately linear, or of convexly outward shape. Preferably, the side surfaces are convexed outward. The side surfaces 34 and 36 have an average slope represented by $\theta$ and $\theta'$, respectively (FIG. 3). $\theta$ and $\theta'$ may range between approximately 43° and 85° and are selected to establish the degree of internal reflection desired. While $\theta$ and $\theta'$ need not be equal, in accordance with the present invention, $\theta$ and $\theta'$ are preferably each larger than 70°. Constructing side walls with these angles insures that light rays travelling through element 32 will be incident upon the side walls 34 and 36 at angles greater than the critical angle, derived by Snell's law, such that the light rays will be totally reflected back through the element 32. Preferably, $\theta$ and $\theta'$ are equal and the elements 32 are laterally symmetrical. If $\theta$ and $\theta'$ are not equal and a symmetrical audience field is desired, alternate lenticular lens elements 32 on the screen viewing surface 30 can be mirror images of each other. The side surfaces 34 and 36 can be constructed so as to both reflect and refract light rays but are preferably constructed so as to be almost entirely internally reflective and direct light from a projection source to the upper tip surface 38.

The upper tip surface 38 can have a variety of shapes, such as circular convex, circular concave, circular concave with convex lip, and circular concave with flat lip. As best shown by FIG. 4, the upper tip surface 38 is preferably formed from three circular surfaces 40, 42 and 44. As shown, circular surfaces 40 and 44 are formed from circularly of equal radii convex cylinders, while circular surface 42 is formed from a circularly concave cylinder. While the upper tip surface 38 can be constructed so as to both refract light, and reflect some light which is subsequently refracted into the audience, preferably the upper tip surface 38 is constructed so as to almost exclusively refract light into the audience field.

The width w' of the upper tip surface 38 depends in part on the average slopes $\theta$ and $\theta'$ of the side surfaces 34 and 36, in part on the refractive index of the material, and in part on the specific lens performance to be attained. In accordance with the objective of the present invention of providing a lenticular array which distributes light horizontally through virtually 180° with perceptually uniform luminance and minimal color shift, it has been found that certain pitch width w to lenticular height h ratios, and tip width w' to pitch width w ratios, are more desirous than others. Accordingly, preferably the lenticular height h to pitch width w is greater than 1:1, and more preferably, at least 3:2. Preferably, the ratio of the pitch width w to the tip width w' is greater than 2:1, and more preferably, at least 3:1.

It will be appreciated by those skilled in the art that a lenticular array can be constructed utilizing the lens element construction described herein in conjunction with other lenticular lens element constructions to optimize a rear projection screen for a particular purpose. However, it has been found that rear projection screens comprising only lenticular lens elements of the construction described herein have yielded excellent gain and efficiency values when distributing light through ±85°.

Rear projection screens 12 made in accordance with the present invention can be manufactured by various processes, including compression molding, injection molding, extrusion, hot roller pressing, casting and photo-polymerization processes. Such screens can be constructed of optically transparent or translucent solid materials such as inorganic glasses and a variety of plastics. In addition, the screen composition can also be a mixture of materials. A preferred material is polymethylmethacrylate.

One-piece screens consisting of two optically functional surfaces can be prepared from two pieces which are suitably affixed together. Such one-piece screen construction enjoys the advantages of lower cost and simplicity. Also, the thickness of the screen is not critical and registration of optical patterns on opposite sides of the sheet is not required.

While diffusion is ordinarily introduced in rear projection screens to enhance the vertical light distribution, it has been found that this diffusion is necessary to achieve the objective of minimal color shift.

Referring to FIG. 1, a typical rear projection color television system 10 includes three projection tube assemblies 16, 18 and 20 for projecting light constituting the three basic colors red, green and blue, respectively, in which the red and blue tube assemblies 16 and 20 are horizontally offset by approximately 11 degrees with respect to the green tube assembly 18. Without further compensation, the offset of the red and blue tube assemblies 16 and 20 causes an uneven horizontal distribution of the intensities of the respective red and blue lights projected by the lenticular elements. This results in the phenomena known as color shift in which a scene on display appears to change in color when viewed at different angles in the horizontal viewing field.

By introducing diffusion between the light collimating Fresnel lenses and the light spreading lenticular lens elements 32, the red and blue light rays, along with the green light rays are sufficiently diffused resulting in a substantially even horizontal dispersion of the respective light rays, and the color shift phenomena is, for the most part, eliminated. This diffusion can be supplied by a bulk property of the refracting material from which the screen is constructed, can be due to surface texturizing of the rear surface (or in the case of two-piece designs any surface other than the front lenticular surface), can be a diffusion layer present in a composite sandwich assembly, or can be produced by some combination of these approaches. Typically, the diffusion should have a Gaussian form and should allow a vertical spread of about ±10° before experiencing a light intensity drop of 50%, i.e. diffusion should provide a diffusing angle between 4 degrees and 15 degrees, and preferably between 8 degrees and 11 degrees.

It should be noted that the orientation of the lens elements 32 on the front surface 30 of the rear projection screen 12 has been characterized as providing a wide horizontal distribution of light. One could easily rotate the rear projection screen 12 by a desired angle, for example by 90°, to provide a wide distribution of light in the vertical direction. In addition, if it is desired to distribute light both in a wide horizontal and a wide vertical plane, a rear projection screen could be constructed having an array of horizontal ribs in accordance with the present invention superimposed upon the vertical ribs of the present invention.

FIG. 5 illustrates the horizontal dispersion of light through catadioptric lenticular lens elements 32 constructed in accordance with the invention. Light rays $r_1$, $r_2$, and $r_3$ travel from the projection source and are collimated by a collimating lens, such as a Fresnel lens, into parallel rays which are distributed by the lenticular lens elements 32. As rays $r_1$, $r_2$ and $r_3$ pass through the homogenous medium of element 32, they travel in straight lines. When rays $r_1$, $r_2$ and $r_3$ impinge upon side surfaces 34 and 36, which are constructed so as to be internally reflecting surfaces, the rays are reflected, the angle of incidence of the rays being equal to their angle of reflection. When rays $r_1$, $r_2$ and $r_3$ strike the upper tip surface 38 at incident angles less than the critical angle of the lens-air interface, the rays are refracted in accordance with Snell's law. It should be noted that while light rays $r_1$, $r_2$ and $r_3$ are described and shown in FIG. 5 as being collimated into parallel light rays prior to entering the lenticular elements 32, this only holds true for some of the light rays impinging the Fresnel lenses, due to the offset of light rays eminating from points away from the center of the green tube assembly 18 along with the above-noted diffusion layer. Consequently, there are many other light rays entering the lenticular lens elements 32 at differing angles from that of the light rays $r_1$, $r_2$ and $r_3$. These other light rays will act similar to rays $r_1$, $r_2$ and $r_3$ up to the point where the angles of incidence thereof with the respective sides 34, 36 of the lenticular lens elements 32 are less than the critical angle, which light rays will then be refracted by the sides 34, 36 and absorbed in a masking material, to be described hereinafter.

As previously noted, the lens elements 32 are successively laterally adjacent and the adjacent side surfaces 34 and 36 are preferably contiguous on the front surface 30. Each element 32 is laterally spaced from an adjacent element 32 so that the respective side surfaces 34 and 36 form between them a groove 46 resembling an outwardly bowed "V" shape. When elements 32 are constructed in accordance with the preferred embodiment of the invention, wherein the overall pitch width w to tip width w' is at least 3:1, at least one-third of the surface area of the front surface 30 is available, if desired, for black masking. Black masking of screen 12 can be accomplished by utilizing a black masking which maintains the reflective characteristics of side surfaces 34 and 36. A preferred method and construction for black masking is described in the copending patent application Ser. No. 567,022, entitled "Improved Blackened Optical Transmission System" filed concurrently herewith. As described in that application, black masking is accomplished by filling a substantial portion of the groove 46 with black discreet particles 48 capable of absorbing visible light, and by containing said articles by means of a skin 50 which extends between the ribs 32 and over the groove 46.

Figure 6:
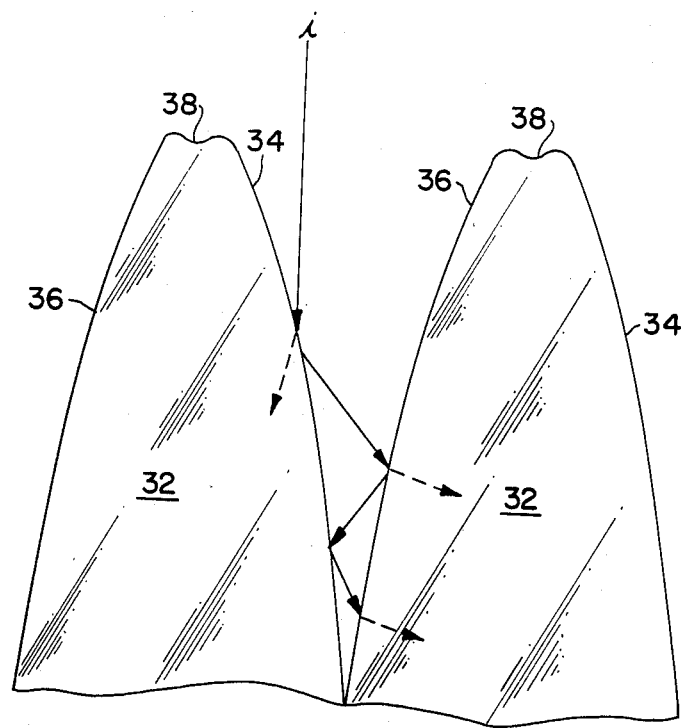
FIG. 6 is a view similar to that of FIG. 3 and shows incident ambient light rays striking the lenticular array of the present invention.

Even without black masking the configuration of lenticular lens elements 32 reflects less ambient light back to the audience field than conventional one-piece screens. This occurs because a large portion of any ambient light strikes the grooved portion 46 of the screen, which comprises approximately two-thirds of the total surface area of surface 30, and passes into the screen. FIG. 6 depicts an approximate path of an incident ambient light ray upon the side surfaces 34 and 36 of the ribs 32. As shown, the solid line indicates either the incident light ray or a reflected ray, while the dashed line indicates a refracted ray. If neutral tinting material is present in the screen composition, incident rays will be attenuated by passage through the screen. Any of these rays reflected from the rear surface 12 and returning back through the front surface 30 will travel, on the average, more than twice as far as rays from the projection sources, thereby providing good picture contrast.

A non-specular front surface 30 can be achieved, if desired, by texturing the front surface so as to provide additional diffusion. Depending upon the degree desired, the entire front surface 30 can be textured. Or, if the screen is black masked, it is only necessary to texture the upper tip portion 38 to provide a non-specular screen. Furthermore, in the case of a black masked screen, an anti-reflective coating can be applied to the exposed tip portions 38 to eliminate specular reflections and further improve screen contrast.

The following example describes a lens element construction in accordance with the present invention which provides good performance in a rear projection color television system. This example is set forth for purposes of illustration and is not to be construed as a limitation on the present invention. The coordinate reference points for the exemplary lens element are depicted in FIG. 3, with the origin being designated as 0, the X-axis measuring position from the lower left hand corner of the reference element toward the right, and the Y-axis measuring position from the lower left hand corner upwards. The lenticular lens element has a pitch of 0.55 mm and is symmetrical about $X=0.275$ mm. All values of Y are greater than or equal to 0 and the lens element is defined as a continuous function for Y.

Each of the symmetrical side surfaces is constructed from 397 straight line segments which are defined by the expression:

$$\text{slope} = M_n = \text{TAN}\,[90° - 0.5 \times \text{ARCTAN}\,[(0.2888 - X_n) \div (0.9280 - Y_n)]]$$

where:
$X_1 = 0$, $Y_1 = 0$.
$D = 0.2131 \div 397 = 5.371 \times 10^{-4}$
$M_1 = 6.5786$
$X_n = (n-1) \times D$
$Y_n = Y_{n-1} + D \times M_{n-1}$ The end point of the 397th segment is $X_{398} = 0.21310$, $Y_{398} = 0.88438$. The shape of the side is determined by the following interpolation rule: given X, $X < 0.21310$ and $X_i \leq X < X_i + 1$ then $Y = Y_i + (X - X_i) \times M_i \geq D$.

The shape of the upper tip portion is defined as follows:

for $0.21310 \leq x < 0.25735$ the shape is a circle with $XO_1 = 0.23971$ and $YO_1 = 0.86896$ and $R = 0.03076$ mm in the formula $$Y = +\sqrt{R^2 - (X - XO_1)^2} + YO_1,$$

and for $0.25735 \leq X < 0.2750$ (the center of the reference lenticular) the shape is a circle with $XO_2 = 0.22750$ and $YO_2 = 0.91936$, R is again equal to 0.03076 mm in the formula $$Y = -\sqrt{R^2 - (X - XO_2)^2} + YO_2.$$

The above expressions define one side of a symmetrical lenticular lens element constructed in accordance with the invention with a pitch of 0.55 m. As previously noted, the lenticular pitch can be changed without changing the performance of the lens, provided all dimensions of the lens are changed in the same proportion. When forming a lenticular screen of the noted lens elements it is preferable that the adjacent lenticular lens elements by touching or that if there is a transition region between the lenticulars that it be less than 1% of the lenticular width. The above lenticular design was actually tested to have a gain of greater than 2.5 and a measured efficency of 79%. These values were realized with a diffusion sufficient to give half-intensity in the vertical direction of ±9.5° about the direction of peak intensity. More vertical field can of course be achieved with more diffusion or the addition of a horizontal lens array surface but with a commensurate loss of screen gain.

The following example describes an alternate lens element construction in accordance with the present invention which also provides good performance in a rear projection color television system. As in the preceding example, the coordinate reference points are depicted in FIG. 3, with the origin being designated as O, the X-axis measuring position from the lower left-hand corner of the reference element toward the right, and the Y-axis measuring position from the lower left-hand corner upwards. The lenticular element 32 is symmetrical about X=0.138 mm and has a pitch of 0.289 mm with a 0.014 mm transition between elements, a base width of 0.275 mm, a tip width of 0.074 mm, and an overall height of 0.424 mm. The focal length of the lens element is 0.44 mm.

Each of the symmetrical side surfaces 34 and 36 is generated by the arcs of 8 circles in accordance with Table 1:

TABLE 1

| I | XOS(I) | YOS(I) | RS(I) | XSTART(I) | XSTOP(I) | SLOPE(I) |
|---|--------|--------|-------|-----------|----------|----------|
| 1 | 5.3098 | −0.8103 | 5.3112 | 0.0000 | 0.0125 | 81.3230 |
| 2 | 3.9786 | −0.5871 | 4.0215 | 0.0125 | 0.0250 | 80.4705 |
| 3 | 2.9000 | −0.3858 | 2.9243 | 0.0250 | 0.0375 | 79.4468 |
| 4 | 2.0432 | −0.2064 | 2.0489 | 0.0375 | 0.0500 | 78.1912 |
| 5 | 1.3834 | −0.0490 | 1.3706 | 0.0500 | 0.0624 | 76.5977 |
| 6. | 0.8952 | 0.0864 | 0.8639 | 0.0624 | 0.0749 | 74.5116 |
| 7 | 0.5538 | 0.1995 | 0.5043 | 0.0749 | 0.0874 | 71.6703 |
| 8 | 0.3305 | 0.2915 | 0.2628 | 0.0874 | 0.1005 | 67.5947 | where I is the circle number, XOS and YOS are the circle coordinates, RS is the circle radius, and SLOPE (I) is in degrees. The Y coordinates may be calculated using the following equation:

$$Y = \sqrt{(RS(I))^2 - (X - XOS(I))^2} + YOS(I)$$

The tip is generated by the arcs of 2 circles in accordance with Table 2.

TABLE 2

| J | XOT(J) | YOT(J) | RT(J) | XTSTART(J) | XTSTOP(J) | YTSTART(J) |
|---|--------|--------|-------|------------|-----------|------------|
| 1 | 0.1101 | 0.4133 | 0.0110 | 0.1005 | 0.1150 | 0.4186 |
| 2 | 0.1375 | 0.4688 | 0.0509 | 0.1150 | 0.1375 | 0.4232 |

The Y coordinates may be calculated using the following equations:

for $0.1005 \leq X < 0.1150$ $$Y = \sqrt{(RT(J))^2 - (X - XOT(J))^2} + YOT(J)$$

for $0.1150 \leq X < 0.1375$ $$Y = -\sqrt{(RT(J))^2 - (X - XOT(J))^2} + YOT(J)$$

As with the preceding example, the lenticular pitch can be changed without changing the performance of the lens, provided all dimensions of the lens are changed in the same proportion. The above lenticular design was actually tested to have a gain greater than 2.5 and an efficiency of 75%. The diffusion half-angle was 11°.

Preferably, the lenticular array is tooled from state of the art devices such as diamond turning lathes and diamond tools. Where tooling limitations are an important consideration, minor deviations can be tolerated and the overall lenticular form, that is the ratios of the pitch to height and pitch to tip width as well as internally reflective side surfaces and refractive tip surfaces, is the primary factor in determining performance.

While in the foregoing specification certain embodiments of this invention have been described in detail, it will be appreciated that modifications and variations therefrom will be apparent to those skilled in the art. Accordingly, this invention is to be limited only by the scope of the appended claims.

What is claimed is:

1. A lenticular lens comprising a base portion, a first side portion, a second side portion, and a tip portion opposite said base portion;
    said first side portion having an average slope of between approximately 70° and 85° with respect to said base portion;
    said second side portion having an average slope of between approximately 70° and 85° with respect to said base portion;
    said first average slope and said second average slope being selected so that said first side portion and said second side portion are substantially internally reflective;
    said tip portion being contiguous with both said first side portion and second side portion, said tip portion comprising two convex cylindrical portions of equal radii and a central concave cylindrical portion and said tip portion being substantially refractive, wherein the ratio of the height of said lens to the width of said base portion is greater than 3:2 and the ratio of the width of said base portion to the width of said tip portion is greater than 2:1.

2. The lenticular lens of claim 1 wherein said first average slope and said second average slope are equal.

3. The lenticular lens of claim 2 which is symmetrical about its central axis.

4. The lenticular lens of claim 3 wherein said two convex cylindrical portions and said central concave cylindrical portion of said tip portion have equal radii.

5. The lenticular lens of claim 3 wherein said width to width ratio is greater than 3:1.

6. The lenticular lens of claim 4 having said first side portion, said second side portion and said tip portion substantially proportional to a lenticular lens defined as having a width equal to 0.55 mm and an axis of symmetry at X=0.275 mm, and each of said symmetrical side portions being constructed from 397 straight line segments which are defined by the expression:

$$\text{slope} = M_n = \text{TAN}\,[90° - 0.5 \times \text{ARCTAN}\,[(0.2888 - X_n) \div (0.9280 - Y_n)]]$$

where:
$X_1 = 0$, $Y_1 = 0$
$D = 0.2131 \div 397 = 5.371 \times 10^{-4}$
$M_1 = 6.5786$
$X_n = (n-1) \text{xD}$
$Y_n = Y_{n-1} + D \times M_{n-1}$ the end point of the 397th segment being $X_{398} = 0.21310$, $Y_{398} = 0.88438$; the shape of said first side portion being determined by the following interpolation rule: given X, $X < 0.21310$ and $X_i \leq X < X_i + 1$ then $Y = Y_i + (X - X_i) \times M_i \div D$;

the shape of said tip portion being defined as follows: for $0.21310 \leq x < 0.25735$ the shape is a circle with $X_1 = 0.23971$ and $YO_1 = 0.86896$ and $R = 0.03076$ mm in the formula $$Y = + \sqrt{R^2 - (X - XO_1)^2} + YO_1,$$

and
for $0.25735 \leq X < 0.2750$ (the center of the reference lenticular) the shape is a circle with $XO_2 = 0.22750$ and $YO_2 = 0.91936$, R is again equal to 0.03076 mm in the formula $$Y = - \sqrt{R^2 - (X - XO_2)^2} + YO_2;$$

and
wherein all values of Y are greater than or equal to 0 and the rib is defined as a continuous function for Y and a slope of Y.

7. A rear projection screen comprising, light collimating means on a rear portion of the screen for receiving and collimating divergent light rays from an image projector, said rays being representative of an image to be displayed by said screen;
light diffusing means for receiving and diffusing said collimated light rays from said light collimating means; and
light spreading means on the front surface of said screen for receiving said diffused light rays from said light diffusing means and deflecting respective ones of said rays to display said image with substantial uniform brightness over a wide viewing angle;
said light spreading means comprising a plurality of closely spaced generally parallel lenticular lenses;
at least some of said lenticular lenses comprising a base portion, a first side portion, a second side portion and a tip portion opposite said base portion;
side first side portion having an average slope of between approximately 70° and 85° with respect to said base portion;
said second side portion having an average slope of between approximately 70° and 85° with respect to said base portion;
said first average slope and said second average slope being selected so that said first side portion and said second side portion are substantially internally reflective;
said tip portion being contiguous with both said first side portion and second side portion, said tip portion comprising two convex cylindrical portions of equal radii and a central concave cylindrical portion and said tip portion being substantially refractive, wherein the ratio of the height of said lenses to the width of said base portion is greater than 3:2 and the ratio of the width of said base portion to the width of said tip portion is greater than 2:1.

8. The rear projection screen claimed in claim 7 wherein all of said plurality of closely spaced generally parallel lenticular lenses are of the same construction.

9. The rear projection screen of claim 8 wherein said first average slope and said second average slope are equal.

10. The rear projection screen of claim 9 wherein said lenticular lenses are symmetrical about their central axes.

11. The rear projection screen of claim 10 wherein said two convex cylindrical portions and said central concave cylindrical portion of said tip portion have equal radii.

12. The rear projection screen of claim 10 wherein said width to width ratio is greater than 3:1.

13. The rear projection screen as claimed in claim 11, wherein said first side portion, said second side portion and said tip portion are substantially proportional to a lenticular lens defined as having a width equal to 0.55 mm and symmetry at X=0.275 mm, and each of said symmetrical side portions being constructed from 397 straight line segments which are defined by the expression:

$$\text{slope} = M_n = \text{TAN}\,(90° - 0.5 \times \text{ARCTAN}\,((0.2888 - X_n) \div (0.9280 - Y_n)))$$

where
$X_1 = 0$, $Y_1 = 0$
$D = 0.2131 \div 397 = 5.371 \times 10^{-4}$
$M_1 = 6.5786$
$X_n = (n-1) \text{xD}$
$Y_n = Y_{n-1} + D \times M_{n-1}$ the end point of the 397th segment being $X_{398} = 0.21310$, $Y_{398} = 0.88438$; the shape of said first side portion being determined by the following interpolation rule: given X, $X < 0.21310$ and $X_i \leq X < X_i + 1$ then $Y = Y_i + (X - X_i) \times M_i \div D$;

the shape of said tip portion being defined as follows: for $0.21310 \leq x < 0.25735$ the shape is a circle with $X_1 = 0.23971$ and $YO_1 = 0.86896$ and $R = 0.03076$ mm in the formula $$Y = + \sqrt{R^2 - (X - XO_1)^2} + YO_1,$$

and
for $0.25735 \leq X < 0.2750$ (the center of the reference lenticular) the shape is a circle with $XO_2 = 0.22750$ and $YO_2 = 0.91936$, R is again equal to 0.03076 mm in the formula $$Y = - \sqrt{R^2 - (X - XO_2)^2} + YO_2;$$

and wherein all values of Y are greater than or equal to 0 and the rib is defined as a continuous function for Y and a slope of Y.

14. The rear projection screen of claim 7 wherein said parallel lenticular lenses define grooves therebetween and said apparatus further comprises means, disposed in said grooves, for absorbing visible light, the means comprising an amount of light-absorbent discrete particles, whereby reflection of visible ambient light impinged on the system is reduced.

15. A rear projection screen as claimed in claim 14 further comprising means for containing the particles within the groove.

16. A rear projection screen comprising, light collimating means on a rear portion of the screen for receiving and collimating divergent light rays from an image project, said rays being representative of an image to be displayed by said screen;
light diffusing means for receiving and diffusing said collimated light rays from said light collimating means; and
light spreading means on the front surface of said screen for receiving said parallel rays from said light collimating means and deflecting respective ones of said rays to display said image with substantial uniform brightness over a wide viewing angle; said light spreading means comprising a plurality of closely spaced generally parallel lenticular lenses;
at least some of said lenticular lenses being comprised of a base portion, a first side portion, a second side portion and a tip portion opposite said base portion;
said first side portion and said second side portion each being substantially internally reflective, said tip portion being substantially refractive, the ratio of the height of said lens to the width of said base portion being greater than 3:2 and the ratio of the width of said base portion to the width of said tip portion being greater than 2:1.

17. The rear projection screen claimed in claim 16 wherein all of said plurality of closely spaced generally parallel lenticular lenses are of the same construction.

18. The rear projection screen of claim 17 wherein said upper tip portion comprises two convex cylindrical portions of equal radii and a central concave cylindrical portion.

19. The rear projection screen of claim 18 wherein said lens is symmetrical about its central axis, said first said portion and said second side portion having equal average slopes and said slopes being in the range between 70° and 85°.

20. The rear projection screen of claim 19 wherein said width to width ratio is at least 3:1.

21. The rear projection screen of claim 19 having said first side portion, said second side portion and said tip portion substantially proportional to a lenticular lens defined as having a width equal to 0.55 mm and an axis of symmetry at X=0.275 mm, and each of said symmetrical side portions being constructed from 397 straight line segments which are defined by the expression:

$$\text{slope} = M_n = \text{TAN}[90° - 0.5 \times \text{ARCTAN}[(0.2888 - X_n) \div (0.9280 - Y_n)]]$$

where:
$X_1 = 0$, $Y_1 = 0$
$D = 0.2131 \div 397 = 5.371 \times 10^{-4}$
$M_1 = 6.5786$
$X_n = (n-1) \times D$
$Y_n = Y_{n-1} + D \times M_{n-1}$ the end point of the 397th segment being $X_{398} = 0.21310$, $Y_{398} = 0.88438$; the shape of said first side portion being determined by the following interpolation rule: given X, X<0.21310 and $X_i \leq X < X_i + 1$ then $Y = Y_i + (X - X_i) \times M_i \div D$;

the shape of said tip portion being defined as follows:
for $0.21310 \leq x < 0.25735$ the shape is a circle with $X_1 = 0.23971$ and $YO_1 = 0.86896$ and $R = 0.03076$ mm in the formula $$Y = +\sqrt{R^2 - (X - XO_1)^2} + YO_1,$$

and
for $0.25735 \leq X < 0.2750$ (the center of the reference lenticular) the shape is a circle with $XO_2 = 0.22750$ and $YO_2 = 0.91936$, R is again equal to 0.03076 mm in the formula $$Y = -\sqrt{R^2 - (X - XO_2)^2} + YO_2;$$

and
wherein all values of Y are greater than or equal to 0 and the rib is defined as a continuous function for Y and a slope of Y.

22. The rear projection screen of claim 16 wherein said parallel lenticular lenses define grooves therebetween and said apparatus further comprises means, disposed in said grooves, for absorbing visible light, the means comprising an amount of light-absorbent discreet particles, whereby reflection of visible ambient light impinged on the system is reduced.

23. A rear projection screen apparatus as claimed in claim 22 further comprising means for containing the particles within the groove.

24. The lenticular lens as claimed in claim 5, wherein said first side portion, said second side portion and said tip portion are substantially proportional to a lenticular lens defined as having a base width equal to 0.275 mm, a tip width equal to 0.074 mm, an overall height equal to 0.424 mm, and a central axis at 0.138 mm.

25. The rear projection screen as claimed in claim 12 or 20, wherein said first side portion, said second side portion and said tip portion are substantially proportional to a lenticular lens defined as having a base width equal to 0.275 mm, a tip width equal to 0.074 mm, an overall height equal to 0.424 mm, and a central axis at 0.138 mm.

* * * * *

UNITED STATES PATENT AND TRADEMARK OFFICE
CERTIFICATE OF CORRECTION

PATENT NO. : 4,573,764

DATED : March 4, 1986

INVENTOR(S) : RALPH H. BRADLEY

It is certified that error appears in the above-identified patent and that said Letters Patent is hereby corrected as shown below:

Claim 6, column 11, line 19

"$X_i \leq X < X_i \div 1$" should be --$X_i \subseteq X < X_i + 1$-- line 20

"i) X $M_i$ + D;" should be --i) X $M_i \div$ D;--

Signed and Sealed this

Twenty-ninth Day of July 1986

[SEAL]

Attest:

DONALD J. QUIGG

Attesting Officer        Commissioner of Patents and Trademarks